United States Patent Office 3,635,971

Patented Jan. 18, 1972

1

3,635,971
3,(3,4-DIHYDRO-3-OXO-2-QUINOXALINYL) PROPIONAMIDES

Tobias O. Yellin, Skokie, Ill., assignor to Abbott Laboratories, Chicago, Ill.

No Drawing. Filed June 18, 1970, Ser. No. 47,617
Int. Cl. C07d *51/78*
U.S. Cl. 260—250 R 10 Claims

ABSTRACT OF THE DISCLOSURE 3-(3,4-dihydro-3-oxo - 2 - quinoxalinyl)propionamides which are useful as tranquilizers and antidepressants.

This invention relates to novel 3-(3,4-dihydro-3-oxo-2-quinoxalinyl)propionamides and methods of preparing the same. The new organic compounds are useful as antidepressants and tranquilizers.

Patients suffering from depression manifest one or more of a variety of symptoms. Generally speaking, depressed patients feel incapable of dealing with their responsibilities. While the predominant symptoms of depression are hypochondria, anorexia, insomnia, anergia, anhedonia and pessimism, it is not uncommon for patients suffering from depression to be anxious and agitated. Such patients often are treated with a combination of antidepressants and tranquilizers. However, it would be highly desirable to administer an antidepressant agent which also exhibits activity as a tranquilizer. The present invention provides such compounds.

The compounds of this invention may exist as tautomers and are represented by the structural Formulas I and II

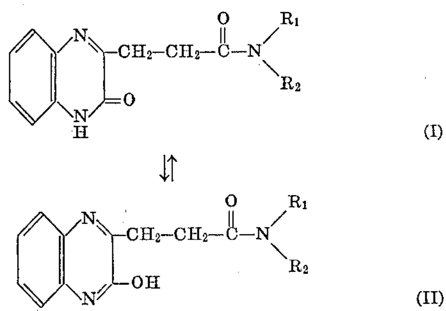

wherein $R_1$ and $R_2$ are the same or different members of the group consisting of $C_1$–$C_3$ alkyl, cyclopropyl, 2-propynyl, phenethyl or substituted phenethyl.

The term "alkyl" as used herein, refers to straight or branched chain alkyl including methyl, ethyl, n-propyl and iso-propyl.

The term "substituted phenethyl" includes phenethyl substituted on either the $\alpha$- or the $\beta$-carbon, or both, such as $\alpha$-methylphenethyl, $\beta$-hydroxyphenethyl, $\alpha$-methyl, $\beta$-hydroxyphenethyl and the like. The moiety can also carry substituents on the phenyl ring in either the ortho, meta or para positions. Such ring substituents can include halo, lower alkyl, lower alkoxy, hydroxy, amino, trifluoromethyl and the like.

It will be understood that while the compounds of the invention may exist on tautomeric equilibrium, the dominant structure is the 3-(2,4-dihydro-3-oxo-2-quinoxalinyl) propionamides of Formula I and hereafter will represent all of the tautomeric forms of the compound of this invention.

Representative compounds of the present invention include the following:

2

3-(3,4-dihydro-3-oxo-2-quinoxalinyl)propionamide
N-methyl-3-(3,4-dihydro-3-oxo-2-quinoxalinyl) propionamide
N-ethyl-3-(3,4-dihydro-3-oxo-2-quinoxalinyl) propionamide
N-propyl-3-(3,4-dihydro-3-oxo-2-quinoxalinyl) propionamide
N-cyclopropyl-3-(3,4-dihydro-3-oxo-2-quinoxalinyl) propionamide
N-iso-propyl-3-(3,4-dihydro-3-oxo-2-quinoxalinyl) propionamide
N-2-propynyl-3-(3,4-dihydro-3-oxo-2-quinoxalinyl) propionamide
N-phenethyl-3-(3,4-dihydro-3-oxo-2-quinoxalinyl) propionamide
N,N-dimethyl-3-(3,4-dihydro-3-oxo-2-quinoxalinyl) propionamide
N,N-tetramethylene-3-(3,4-dihydro-3-oxo-2-quinoxalinyl)propionamide
N,N-diethyl-3-(3,4-dihydro-3-oxo-2-quinoxalinyl) propionamide The compounds, represented by general Formula I and their 3-hydroxy tautomers, represented by Formula II, are antidepressant agents when administered to mammals in dosages of from 0.2 to 50 mg./kg. of body weight daily, either in single or divided doses. The antidepressant activity of the compounds was established according to the modified dopa test described by G. M. Everett, et al., Proc. 1st Int. Symp. Antidepressant Drugs, p. 164 (1966). In addition to their antidepressant activity, the compounds of this invention exhibit activity as tranquilizers when administered to mammals in dosages of from 10–300 mg./kg. of body weight daily, either in single or divided doses. The combination of antidepressant and tranquilizing activity makes the above compounds particularly useful in treating depressed patients who are anxious and agitated.

The oral $LD_{50's}$ of the compounds of this invention are $>1000$ mg./kg. in mice. The i.p. $LD_{50's}$ in mice are from 500 to $>1000$ mg./kg.

The compounds of this invention, when used as antidepressants or tranquilizers, can be formulated into various pharmaceutical dosage forms such as tablets, capsules, pills and the like, for immediate or sustained release, by combining the active compounds with suitable pharmaceutically acceptable carriers or diluents according to methods well known in the art. Such dosage forms may additionally include excipients, binders, fillers, flavoring and sweetening agents and other therapeutically inert ingredients necessary in the formulation of the desired pharmaceutical preparation.

The compounds are generally administered to mammalian patients in doses of from 0.2 to 300 mg./kg. of body weight daily, either in single or divided doses over a period of 24 hours. While the compounds are active by various routes, oral administration is the preferred route of administration.

The compounds of this invention can be prepared by methods well known in the art, such as by aminolysis of the methyl ester of the appropriate parent acid, or by reacting an appropriate amine with the mixed anhydride of the parent acid and ethylformate. Alternatively, the amine can be reacted with the activated product of the parent acid and a suitable carbodiimide to yield the desired amide.

The starting materials, 2-quinoxalinol-3-propionic acid and the methyl ester thereof, are reported in the literature and can be prepared according to standard literature procedures. In the practice of this invention, 2-quinoxalinol-3-propionic acid was prepared by mixing equimolar amounts of o-phenylenediamine dihydrochloride and 2-ketoglutaric acid in an aqueous solution, filtering the resulting precipitate, washing the precipitate and drying it. The methyl ester was obtained by refluxing a suspension of the acid in methanol containing catalytic amounts of p-toluenesulfonic acid, according to well known literature methods.

The following examples further illustrate the present invention.

EXAMPLE 1

Preparation of 3-(3,4-dihydro-3-oxo-quinoxalinyl) propionamide 17.5 g. of 2-quinoxalinol-3-propionic acid, methyl ether, prepared as described above, was suspended in 1420 ml. of 28% ammonium hydroxide and the suspension was stirred at room temperature for 48 hours. The resulting solution was heated at 50° C. for about one hour until a precipitate started to form. The solution was then placed in a rotary evaporator under reduced pressure for 1 hour at 50° C. Precipitation was heavy and only a faint odor of ammonia remained. The resulting white crystalline solid was filtered, washed with water until neutral, washed with methanol and dried in vacuo to yield 14.9 g. of 3-(3,4-dihydro-3-oxo-2-quinoxalinyl) propionamide, M.W. 217.21; M.P. (d.) 276° C.

*Analysis.*—Calc. for $C_{11}H_{11}N_3O_2$ (percent): C, 60.81; H, 5.10; N, 19.34. Found (percent): C, 60.83; H, 5.40; N, 19.33.

EXAMPLE 2

Preparation of N-2-propynyl-3-(3,4-dihydro-3-oxo-2-quinoxalinyl)propionamide 2.18 g. of 2-quinoxalinol-3-propionic acid, prepared as described above, was dissolved in 30 ml. of dimethylacetamide containing 1.4 ml. of triethylamine. The reaction mixture was cooled to −2° C. and the temperature was maintained below −0° C. while a solution of 1.09 g. of ethylchloroformate dissolved in 10 ml. of dimethylacetamide was added dropwise to the reaction mixture. The mixture was stirred for 1½ hours and then filtered to remove the triethylamine hydrochloride. The filtrate was cooled to −2° C. To the filtrate was added dropwise 0.775 g. of propargylamine dissolved in 5 ml. of dimethylacetamide. The temperature was maintained below 0° C. during the addition. The reaction mixture was stirred for 3½ hours at room temperature, poured into 10 volumes of water and stored under refrigeration overnight. The resulting suspension was filtered to yield 1.5 g. of a tan powder. Recrystallization from ethanol yielded 1.37 g. of N-2-propynyl-3-(3,4-dihydro-3-oxo-2-quinoxalinyl) propionamide as a microcrystalline powder, M.W. 255.179; M.P. (d.) 241° C.

*Analysis.*—Calc. for $C_{14}H_{13}N_3O_2$ (percent): C, 65.89; H, 5.13; N, 16.46. Found (percent): C, 65.88; H, 5.16; N, 16.63.

EXAMPLES 3–7

The following compounds were prepared according to the method of Example 1 from the methyl ester of 2-quinoxalinol-3-propionic acid and the corresponding amine.

N-ethyl-3-(3,4-dihydro-3-oxo-2-quinoxalinyl)propionamide, M,P. 269° (d.) C, from the methyl ester of 2-quinoxalinol-3-propionic acid and ethylamine.

*Analysis.*—Calc. for $C_{13}H_{15}N_3O_2$ (percent): C, 63.65; H, 6.19; N, 17.13. Found (percent): C, 63.97; H, 5.97; N, 16.99.

N-cyclopropyl-3-(3,4-dihydro-3-oxo-2-quinoxalinyl) propionamide, M.P. 275° (d.) C, from 2-quinoxalinol-3-propionic acid, methyl ester and cyclopropyl amine.

*Analysis.*—Calc. for $C_{14}H_{15}N_3O_2$ (percent): C, 65.35; H, 5.87; N, 16.33. Found (percent): C, 65.27; H, 6.08; N, 16.25.

N,N-tetramethylene-3-(3,4-dihydro-3-oxo-2-quinoxalinyl) propionamide M.P. 181° (d.) C, from 2-quinoxalinol-3-propionic acid, methyl ester and pyrrolidine.

*Analysis.*—Calc. for $C_{15}H_{17}N_3O_2$ (percent): C, 66.40; H, 6.31; N, 15.48. Found (percent): C, 66.58; H, 6.16; N, 15.59.

N-phenethyl-3-(3,4-dihydro-3-oxo-2-quinoxalinyl) propionamide, M.P. 234° (d.) C, from 2-quinoxalinol-3-propionic acid, methyl ester and phenethylamine.

*Analysis.*—Calc. for $C_{19}H_{19}N_3O_2$ (percent): C, 70.78; H, 6.25; N, 13.03. Found (percent): C, 70.83; H, 6.24; N, 13.05.

N,N-dimethyl-3-(3,4-dihydro-3-oxo-2-quinoxalinyl) propionamide, M.P. 233° (d.) C, was prepared according to Example 2 from the 2-quinoxalinol-3-propionic acid, methyl ester and dimethylamine, except that the reaction was run in a bomb at 100° for 30 hours.

*Analysis.*—Calc. for $C_{13}H_{15}N_3O_2$ (percent): C, 63.65; H, 6.16; N, 17.13. Found (percent): C, 63.68; H, 6.16; N, 16.95.

EXAMPLE 8

N,N-diethyl-3-(3,4-dihydro-3-oxo-2-quinoxalinyl) propionamide, M.P. 1590 (d.) C, was prepared according to the method of Example 2, from the 2-quinoxalinol-3-propionic acid and diethylamine.

*Analysis.*—Calc. for $C_{15}H_{19}N_3O_2$ (percent): C, 65.90; H, 7.00. Found (percent): C, 66.00; H, 7.21.

I claim:

1. A compound of the formula

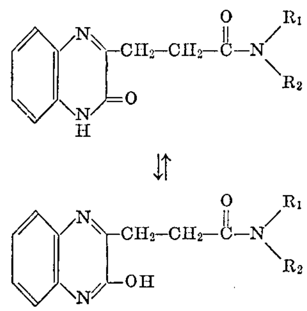

wherein $R_1$ and $R_2$ are the same or different members of the group consisting of $C_1$–$C_3$ alkyl, cyclopropyl, 2-propynyl, phenethyl.

2. A compound in accordance with claim 1, 3-(3,4-dihydro-3-oxo-2-quinoxalinyl)propionamide.

3. A compound in accordance with claim 1, N,N-diethyl-3-(3,4-dihydro-3-oxo-2-quinoxalinyl)propionamide.

4. A compound in accordance with claim 1, N,N-dimethyl-3-(3,4-dihydro-3-oxo-2-quinoxalinyl)propionamide.

5. A compound in accordance with claim 1, N-methyl-3-(3,4-dihydro-3-oxo-2-quinoxalinyl)propionamide.

6. A compound in accordance with claim 1, N-cyclopropylmethyl-3-(3,4-dihydro-3-oxo-2-quinoxalinyl) propionamide.

7. A compound in accordance with claim 1, N-ethyl-3-(3,4-dihydro-3-oxo-2-quinoxalinyl)propionamide.

8. A compound in accordance with claim 1, N,N-tetramethylene-3-(3,4-dihydro-3-oxo-2-quinoxalinyl)propionamide.

9. A compound in accordance with claim 1, N-phenethyl-3-(3,4-dihydro-3-oxo-2-quinoxalinyl)propionamide.

10. A compound in accordance with claim 1, N-2-propynyl-3-(3,4-dihydro-3-oxo-2-quinoxalinyl)propionamide.

References Cited

UNITED STATES PATENTS 3,479,347 11/1969 Wendt et al. ------- 260—250 R

NICHOLAS S. RIZZO, Primary Examiner

U.S. Cl. X.R.

424—250

UNITED STATES PATENT OFFICE
CERTIFICATE OF CORRECTION

Patent No. 3,635,971 Dated January 18, 1972

Inventor(s) Tobias O. Yellin

It is certified that error appears in the above-identified patent and that said Letters Patent are hereby corrected as shown below:

Column 3, line 13 please delete "ether" and insert --ester--.

Column 4, line 20 please delete "1590" and insert --159°--.

Signed and sealed this 1st day of August 1972.

(SEAL)
Attest:

EDWARD M.FLETCHER,JR.
Attesting Officer

ROBERT GOTTSCHALK
Commissioner of Patents